United States Patent [19]

Dighe

[11] 4,362,789

[45] Dec. 7, 1982

[54] FUEL CELL COOLING AND RECIRCULATION SYSTEM

[75] Inventor: Shyam V. Dighe, Bombay, India

[73] Assignee: Westinghouse Electric Corp., Pittsburgh, Pa.

[21] Appl. No.: 303,808

[22] Filed: Sep. 21, 1981

[51] Int. Cl.³ .................................................. H01M 8/04
[52] U.S. Cl. ........................................ 429/17; 429/20; 429/26; 429/34
[58] Field of Search ..................... 429/13, 17, 26, 20, 429/34

[56] References Cited

U.S. PATENT DOCUMENTS

| | | | |
|---|---|---|---|
| 3,172,784 | 3/1965 | Blackmer | 136/86 |
| 3,368,923 | 2/1968 | Smith | 136/86 |
| 3,455,743 | 7/1969 | Huebscher et al. | 136/86 |
| 3,479,224 | 11/1969 | Jager | 136/86 |
| 3,498,844 | 3/1970 | Sanderson | 136/86 |
| 3,516,807 | 6/1970 | West et al. | 48/107 |
| 3,516,867 | 6/1970 | Dankese | 136/86 |
| 3,553,026 | 1/1971 | Winsel | 136/86 |
| 3,629,075 | 12/1971 | Gutbler | 203/1 |
| 3,716,415 | 2/1973 | Gagnon et al. | 136/86 B |
| 3,801,372 | 4/1974 | Shaw | 429/13 |
| 3,811,951 | 5/1974 | Stedman | 136/86 B |
| 3,982,961 | 9/1976 | Grasso | 429/34 |
| 4,037,024 | 7/1977 | Landau | 429/17 |

Primary Examiner—Charles F. LeFevour
Attorney, Agent, or Firm—W. E. Otto

[57] ABSTRACT

Method and apparatus for cooling and recirculating oxidant to the cathode of a fuel cell stack. Heat energy is removed from the fuel cell stack through utilization of excess air or other oxidant relative to the stoichiometric amount for reaction with a hydrogen-containing fuel. Reaction products, including excess air and water, flow to a nozzle upstream of a flow constricting venturi. A coolant, such as liquid water in a fine spray form, is injected through the venturi and draws the reaction products through the venturi. The mixing of the coolant and the reaction products results in a condensation of the high temperature reaction product water vapor and further dehumidification of the reaction products takes place in a passive separator such as a demister. Coolant is injected into the venturi in sufficient quantity to develop the pressure head necessary to recirculate the cooled and dehumidified air through a conduit system and back to the fuel cell stack. A supply of makeup air is also provided. Coolant and water collected in the passive separator can also be recirculated for injection through the venturi.

9 Claims, 2 Drawing Figures

FUEL CELL COOLING AND RECIRCULATION SYSTEM

BACKGROUND OF THE INVENTION

1. Field of the Invention

This invention relates to fuel cell systems, and more particularly provides method and apparatus for cooling and recirculating fuel cell discharge products.

2. Description of the Prior Art

In a fuel cell system, typically including a plurality of individual cells arranged in a stack, process reactants including a fuel, such as hydrogen, and an oxidant, such as air, undergo an electrochemical reaction, through an electrolyte such as phosphoric acid, to produce an electric current. The reaction is exothermic, thus also providing heat, and reaction products in a hydrogen and oxygen process include high temperature water vapor. The water is formed predominantly on the cathode side of the reacting cells. The heat of the electrochemical reaction must be continuously removed in order to prevent the cell temperature from rising to a point which could damage cell components and system efficiency.

Heat and water have typically been removed from the fuel cell stack by circulating excess air across the cathode. The excess air becomes humidified and heated as it passes through the cell. The excess air has typically been cooled by passage through heat exchangers, and dehumidified in separate dehumidification equipment. The heat exchanger and dehumidification functions have been performed separately, and in distinct units. A high temperature prime mover, such as a pump or blower, has also been needed in order to circulate the excess air through a cooling loop. Particularly for high system pressures, the size, complexity and cost of the prime mover is a substantial factor in overall system efficiency, particularly where the prime mover is exposed directly to high temperature reaction products.

More recently proposed have been cooling loops which circulate a liquid or a gaseous coolant through selected portions of the fuel cell stack. Such systems, however, additionally require a substantial circulation pumping device and elaborate leak tight manifolding systems.

It is desirable to provide fuel cell systems which effectively remove heat from the fuel cell stack with simplified components and without substantial detraction from system efficiency.

SUMMARY OF THE INVENTION

This invention provides a fuel cell system which alleviates the necessity for a large pumping apparatus in a loop circulating high temperature reaction products which, subsequent to cooling and dehumidification, returns the treated product stream back to the fuel cell stack. In preferred form the reaction products, including excess oxidant such as air, and water vapor, are conducted from the stack to a nozzle. The nozzle is connected to a flow constriction, such as a venturi. A liquid coolant, preferably water, is injected from the nozzle into and through the throat of the venturi. The action of the coolant flowing through the venturi pulls reaction products from the nozzle through the venturi. In this manner the coolant and reaction products are mixed, and the high temperature water vapor tends to condense upon the droplets of coolant. The rate of coolant injection through the venturi is selected so as to provide sufficient condensation of the water vapor and sufficient pressure head to circulate a selected portion of the reaction products through downstream separation apparatus and conduits connecting the separation apparatus to the fuel cell stack cathode region.

Subsequent to expansion downstream of the venturi, the mixed coolant, excess air and reaction product water are passed to a passive separation device. The device can be any conventional demister, entrainment separator, or cyclone. Within the separation device, further condensation occurs and liquids are gathered at the lower portion of the device. Gases separated in the device, particularly high in air or oxygen content, are discharged through an outlet and flow through conduits, preferably to the cathode elements of the fuel cell stack. The separated liquid can be discharged from the separator, cooled through conventional heat exchange apparatus and recycled to the injector for injection through the venturi. Heat energy extracted from the condensed liquids in the heat exchanger can be utilized for process heating or other energy utilization means. System pressure and oxidant content can be controlled through a small low temperature oxidant compressor and a reaction product vent.

BRIEF DESCRIPTION OF THE DRAWINGS

The advantages, nature and additional features of the invention will become more apparent from the following description, taken in connection with the accompanying drawing, in which.

DESCRIPTION OF THE PREFERRED EMBODIMENTS

Figure 1:
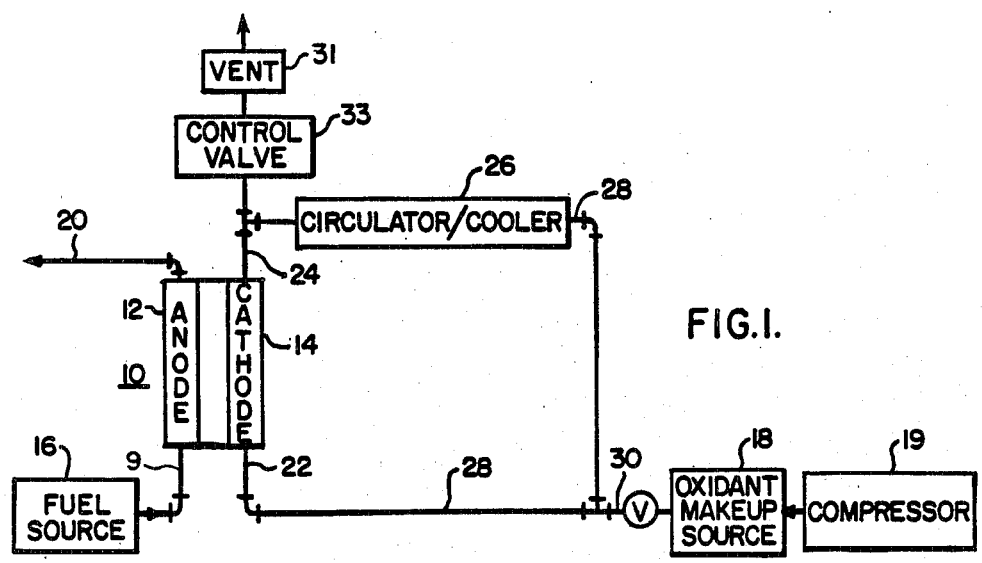
FIG. 1 is a schematic of a fuel cell system in accordance with the invention.

Referring now to FIG. 1 there is shown in simplified form a fuel cell stack 10. A typical stack includes a plurality of fuel cells arranged electrically in series, including a plurality of anodes 12 and cathodes 14 separated by an electrolyte. An exemplary fuel cell stack circulates a fuel, such as one including hydrogen, through a space adjacent the cell anode, and an oxidant, such as air, through a space adjacent the cell cathode. The exemplary system utilizes a phosphoric acid electrolyte. The electrochemical reaction generates direct current electrical energy, heat, and water vapor. Hydrogen-containing fuel can be provided from a fuel source 16, and an oxidant, such as air, can be provided from an oxidant makeup source 18. The makeup source 18 includes a small compressor 19 operating upon air at ambient conditions. An excess amount of oxidant is provided to the fuel cell stack relative to the stoichiometric amount necessary for reaction with the hydrogen-containing process fuel. The excess oxidant thus serves as a means for withdrawing heat from the fuel cell stack 10 to alleviate damage to the cell components.

Fuel, from a source 16, enters the anode side of the stack through a conduit 9. Reaction products are discharged from the anode side of the stack through a conduit 20, and include unused process fuel and small amounts of water vapor. Air enters the cathode side of the stack from a conduit 22 and reaction products, including excess air and water vapor are discharged from the stack into a conduit 24. In accordance with the invention, a portion of the reaction products are conducted from conduit 24 to a circulator-cooler 26. From the circulator-cooler 26 the contained air is recirculated through conduit 28 back to the fuel cell stack 10. Additional air can be provided from the makeup source 18 to conduit 28 through an oxidant supply means conduit 30.

Operating pressure is maintained within the system through the compressor 19, a vent 31 including a control valve 33, and conventional monitoring and control apparatus (not shown). The exemplary system pressure is maintained at approximately fifty psia. The oxidant makeup source 18 and vent 31 cooperate to discharge cathode reaction products and provide fresh oxidant such that the ratio of reaction product recirculation to fresh oxidant supply is approximately thirty to one. The pressure drop throughout the system, which is compensated by the circulator-cooler 26, is approximately five inches of water, including approximately two to three inches in the stack 10 and several inches of water through the connecting conduits.

Figure 2:
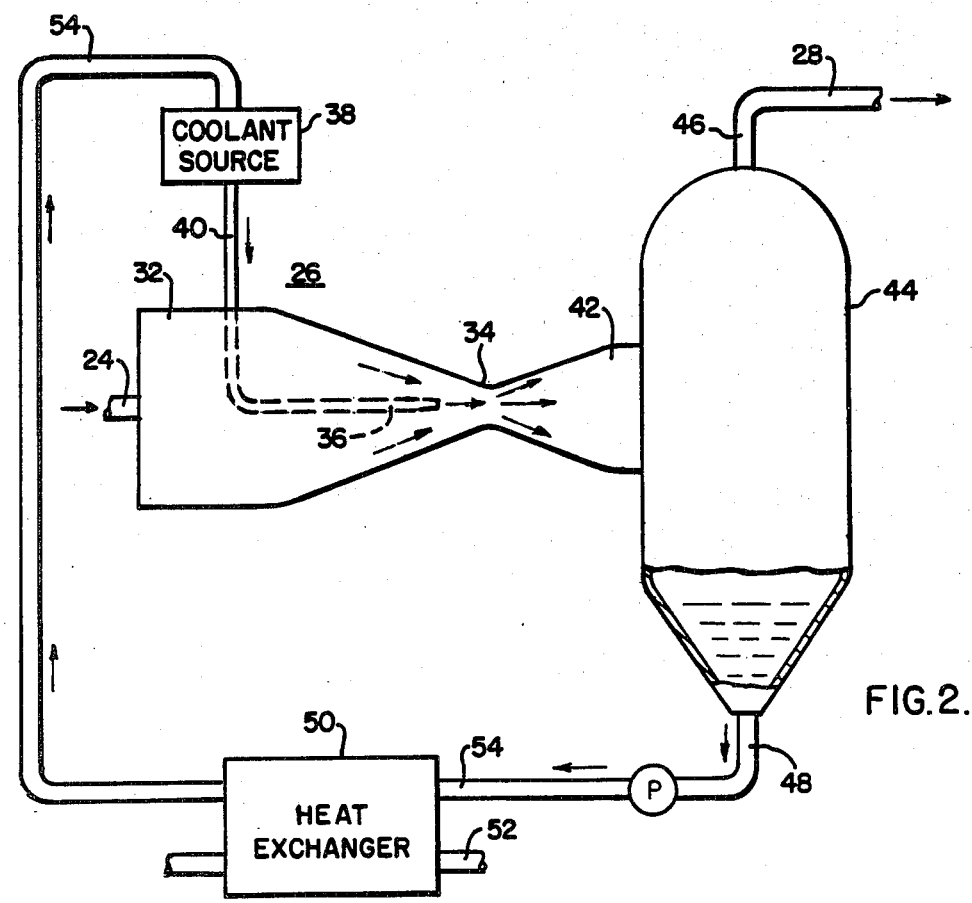
FIG. 2 is a schematic of a portion of the system of FIG. 1.

Referring now to FIG. 2, reaction products discharged from the cathode side into conduit 24 are directed to an enlarged nozzle 32. The nozzle communicates with a flow constriction such as a venturi 34. From within the nozzle 32, an injector 36 directs a cool liquid coolant, preferably water, through the venturi 34. The injector 36 receives liquid coolant from a coolant source 38 through a conduit 40. Injection of the coolant through the venturi 34 draws reaction products from within the nozzle 32 through the venturi 34, thus mixing the coolant and the reaction products which are discharged into a chamber 42. Preferably the liquid coolant is injected as a fine spray, and the mixing of the coolant and the reaction products results in spray condensation of the water vapor in the reaction products upon the sprayed droplets. Additionally, expansion of the mixture from the high velocity venturi region to the enlarged chamber 42, converts the velocity to a pressure head. The coolant injection quantity and velocity provides sufficient head to circulate a gaseous medium from the chamber 42, through a separator 44, to conduit 28 and back through the fuel cell stack. The reaction products are discharged from the fuel cell stack at a temperature in the range of 400° F. for the exemplary phosphoric acid system, and can be in the range of 1200° F. or higher for molten carbonate fuel cell systems. Preferably the coolant is injected through injector 36 at a temperature which is at least 100° F. below the dew point temperature of the reaction products.

From the chamber 42 the mixture enters a liquid-gas separator 44. The separator is preferably passive, requiring no moving parts. It can be of any conventional type, alternatively referred to as a cyclone device, an entrainment separator, or a demister. For example, a Flexi Chevron type, available from Koch Engineering Inc., of New Jersey, is an applicable device. Such devices typically collect a liquid at a lower portion thereof, and discharge a gas at an upper portion. In the exemplary system, a first portion having a large oxidant and a very small coolant and low water vapor content will exit the separator 44 through an outlet 46. A second portion, being substantially liquid and having a large coolant and water content and a relatively small contained oxidant content, is discharged from the separator 44 through an outlet 48. The second portion can be used directly as a heat source, or can be passed through a heat exchanger 50 to transfer heat to another utilization loop 52. Subsequent to cooling, the second portion can additionally be recirculated through conduit 54 to the coolant source 38, and injected through the injector 36.

The injection coolant is preferably water, although any low temperature liquid, such as a synthetic oil with a low vapor pressure, which will not deleteriously affect the fuel cell stack components, can be utilized. In this instance an additional oil-water separator, which can be a conventional settling tank, is preferably utilized prior to reinjection of the coolant through the injector 36.

Since numerous changes may be made in the disclosed system with departing from the spirit and scope thereof, it is intended that the foregoing description be interpreted as illustrative, and not in a limiting sense.

I claim:

1. A fuel cell system comprising:
   a fuel cell stack including an anode and a cathode;
   means for supplying a hydrogen-containing fuel to said anode;
   means for supplying an oxygen-containing oxidant to said cathode in an amount in excess of the stoichiometric amount relative to said fuel;
   means for conducting reaction products including excess oxidant and water vapor from said cathode;
   means for cooling and flowing said products through a flow constriction, said cooling and flow means including a liquid coolant injector;
   means disposed downstream of said flow constriction for separating said coolant, oxidant and water into a vaporous portion having a large oxidant and small coolant and water content and a liquid portion having a large coolant and water content and a small oxidant content, said separating means including an outlet for said vapor portion; and
   a conduit interconnecting said outlet and said cathode;
   said cooling and flow means providing sufficient pressure head to flow said vaporous portion through said interconnecting conduit to said cathode.

2. The system of claim 1 wherein said oxidant supply means comprises a compressor.

3. The system of claim 2 further comprising means for controlling pressure within said system, said means including a vent disposed downstream of said cathode space and upstream of said cooling and flow means.

4. A fuel cell system comprising:
   a fuel cell stack including an anode and a cathode;
   means for supplying a hydrogen-containing fuel adjacent said anode;
   means for supplying an oxygen-containing oxidant adjacent said cathode in an amount in excess of the stoichiometric amount relative to said fuel;
   means for conducting reaction products including excess oxidant and water vapor from said cathode;
   means for cooling and flowing said products through a flow constriction, said cooling and flow means including a liquid coolant injector;
   means disposed downstream of said flow constriction for separating said coolant, oxidant and water into a vaporous portion and a liquid portion, said separating means including an outlet for said vapor portion; and
   a conduit interconnecting said outlet and said cathode;
   said cooling and flow means providing sufficient pressure head to flow said vaporous portion through said interconnecting conduit, adjacent said cathode, and back to said flow constriction; and means for conducting said liquid portion through a heat exchanger and to said injector.

5. A method of operating a fuel cell system including a fuel cell stack having an anode and a cathode, comprising:

supplying a hydrogen-containing fuel to said anode;

supplying an oxygen-containing oxidant to said cathode in an amount in excess of the stoichiometric amount relative to said fuel;

conducting reaction products including excess oxidant and water from said cathode;

injecting a liquid coolant through a flow constriction in fluid communication with said reaction products whereby said coolant and reaction products are mixed, flow through said constriction, and said reaction products are cooled;

separating said mixed reaction products and coolant into a vaporous portion and a liquid portion; and conducting said vaporous portion to said cathode;

said step of flowing said products through a flow constriction including providing sufficient pressure head to flow said vaporous portion to said cathode.

6. The method of claim 5 further comprising cooling said liquid portion and injecting said cooled liquid portion through said flow constriction.

7. The method of claim 5 wherein said injecting step comprises injecting a liquid coolant as a fine spray through said flow constriction.

8. The method of claim 7 further comprising flowing fresh oxidant into said system in an amount such that the ratio of the mass flow of reaction products recirculating through said system to the mass flow of fresh oxidant is approximately thirty to one.

9. The method of claim 5 further comprising venting a portion of said reaction products from said system prior to said injecting step.

* * * * *